United States Patent [19]
Jandron

[11] Patent Number: 5,758,944
[45] Date of Patent: Jun. 2, 1998

[54] VEHICLE SIDE/FRONT BRAKE LIGHTS

[76] Inventor: Gary David Jandron, 636 Meisner Rd., East China, Mich. 48054

[21] Appl. No.: 578,017

[22] Filed: Dec. 26, 1995

[51] Int. Cl.$^6$ ................................................. B60Q 1/44
[52] U.S. Cl. .......................... 362/80; 362/83; 362/83.3; 340/479
[58] Field of Search ........................ 362/61, 80, 82, 362/83, 83.3, 80.1; 340/479, 475

[56] References Cited

U.S. PATENT DOCUMENTS 5,255,165  10/1993  Cail ........................................ 362/80.1
5,258,740  11/1993  Viano et al. ........................ 340/479 X
5,373,426  12/1994  O'Sullivan ............................ 362/83.3

*Primary Examiner*—Stephen F. Husar

[57] ABSTRACT

Vehicle side/front brake lights comprising a brake indicator bulb located in a recess formed in a side of a vehicle at a front extent thereof. The brake indicator bulb is actuated upon braking of the vehicle. Also, a cover with a red hue is coupled over the recess allowing the brake indicator light to disperse a red light from the side of the vehicle upon braking thereby warning pedestrians, bicycles, and other vehicles to a side/front thereof.

2 Claims, 3 Drawing Sheets

5,758,944

VEHICLE SIDE/FRONT BRAKE LIGHTS

BACKGROUND OF THE INVENTION

1. Field of the Invention

The present invention relates to a new and improved vehicle side/front brake lights and, more particularly, pertains to indicating a present braking status to a pedestrian, bicyclist, or other vehicle at a side/front extent thereof.

2. Description of the Prior Art

The use of brake lights is known in the prior art. More specifically, brake lights heretofore devised and utilized for indicating whether a driver is braking are known to consist basically of familiar, expected, and obvious structural configurations, notwithstanding the myriad of designs encompassed by the crowded prior art which has been developed for the fulfillment of countless objectives and requirements.

The prior art discloses a large number of brake lights. By way of example, U.S. Pat. No. 5,272,602, to Sasajima et al. discloses a device for mounting a supplemental stop lamp to a window pane or the like. U.S. Pat. No. 5,219,218 to Iino discloses a stop light for vehicle comprising a ground circuit formed by the vehicles body. Des. Pat. No. 314,244 to Matsumura et al. discloses the ornamental design for an auxiliary vehicle stop light. U.S. Pat. No. 3,639,748 Pearson et al.; U.S. Pat. No. 4,087,784 to West; Des. Pat. No. 313,661 to Kang are provided as being of general interest.

In this respect, the vehicle side/front brake lights according to the present invention substantially departs from the conventional concepts and designs of the prior art, and in doing so provides an apparatus primarily developed for the purpose of indicating a present braking status to a pedestrian, bicyclist, or other vehicle at a side/front extent thereof.

Therefore, it can be appreciated that there exists a continuing need for a new and improved vehicle side brake lights which can be used for indicating a present braking status to a pedestrian, bicyclist, or other vehicle at a side/front extent thereof. In this regard, the present invention substantially fulfills this need.

SUMMARY OF THE INVENTION

In view of the foregoing disadvantages inherent in the known types of brake lights now present in the prior art, the present invention provides an improved vehicle side/front brake lights. As such, the general purpose of the present invention, which will be described subsequently in greater detail, is to provide a new and improved vehicle side/front brake lights and methods which have all the advantages of the prior art and none of the disadvantages.

To attain this, the present invention essentially comprises a rectangular light frame situated on a side/front of a vehicle at a front extent thereof. The light frame comprises an upper wall, lower wall, pair of side walls, and rear wall. The rear wall has a V-shaped divider formed at a central extent thereof which defines an upper rectangular recess and lower rectangular recess. The light frame has a first pair of bores formed in a top extent of the upper recess and a second pair of bores formed in a bottom extent of the lower recess. Such bores are adapted to receive a plurality of screws thereby allowing the light frame to be coupled to a conventional vehicle body. A turn signal bulb controlled by a conventional turn signal lever is located in the upper recess of the light frame. The turn signal bulb is of the vehicle. A brake indicator bulb is located in the lower recess of the light frame. The brake indicator bulb is controlled by a conventional brake pedal of the vehicle. A two-tone translucent cover has a rectangular top portion with an amber hue and a first type of light diffusing structure and further has a rectangular lower portion with a red hue and a second type of diffusing structure. The cover also has two pair of apertures positioned at opposite ends thereof. Also included are two pair of coupling devices each comprising a U-shaped clip rotated ninety degrees. Each coupling device has a pair of friction members coupled to an inner surface thereof and extended inwardly therefrom. A flange with an aperture situated therein is formed on an outboard end of each U-shaped clip and extended upwardly therefrom. The U-shaped clips are adapted to secure to a periphery of the upper wall and lower wall of the light frame whereby an inner surface of the outboard end, the friction members, and inboard ends of the U-shaped clip abut each respective wall. A bushing with two pair of apertures lines the periphery and divider of the cover. A pair of screws are included for screwably coupling within the apertures of the cover, bushing, and U-shaped clips thereby allowing the securement thereof to the light frame. With the cover, bushing, and U-shaped clips secured in a proper position, the turn signal bulb is allowed to disperse an amber light upon actuation of the turn signal and the brake indicator light is allowed to disperse a red light from the side of the vehicle upon actuation of the brake pedal.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent of legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved vehicle side/front brake lights which has all the advantages of the prior art brake lights.

It is another object of the present invention to provide a new and improved vehicle side/front brake lights which may be easily and efficiently manufactured and marketed.

It is a further object of the present invention to provide a new and improved vehicle side/front brake lights which is of a durable and reliable construction.

An even further object of the present invention is to provide a new and improved vehicle side/front brake lights which is susceptible of a low cost of manufacture with regard to both materials and labor, and which accordingly is then susceptible of low prices of sale to the consuming public, thereby making such vehicle side/front brake lights economically available to the buying public.

Still yet another object of the present invention is to provide a new and improved vehicle side/front brake lights which provides in the apparatuses and methods of the prior art some of the advantages thereof, while simultaneously overcoming some of the disadvantages normally associated therewith.

Even still another object of the present invention is to provide a vehicle side/front brake lights which indicates a present braking status to a pedestrian, bicyclist, or other vehicle at a side/front extent thereof.

Lastly, it is an object of the present invention to provide a vehicle side/front brake lights comprising a brake indicator bulb located in a recess formed in a side/front of a vehicle at a front extent thereof. The brake indicator bulb is actuated upon braking of the vehicle. Also, a cover with a red hue is coupled over the recess allowing the brake indicator light to disperse a red light from the side/front of the vehicle upon braking thereby warning pedestrians, bicycles, and other vehicles to a side/front thereof.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts throughout the various Figures.

DESCRIPTION OF THE PREFERRED EMBODIMENT

Figure 1:
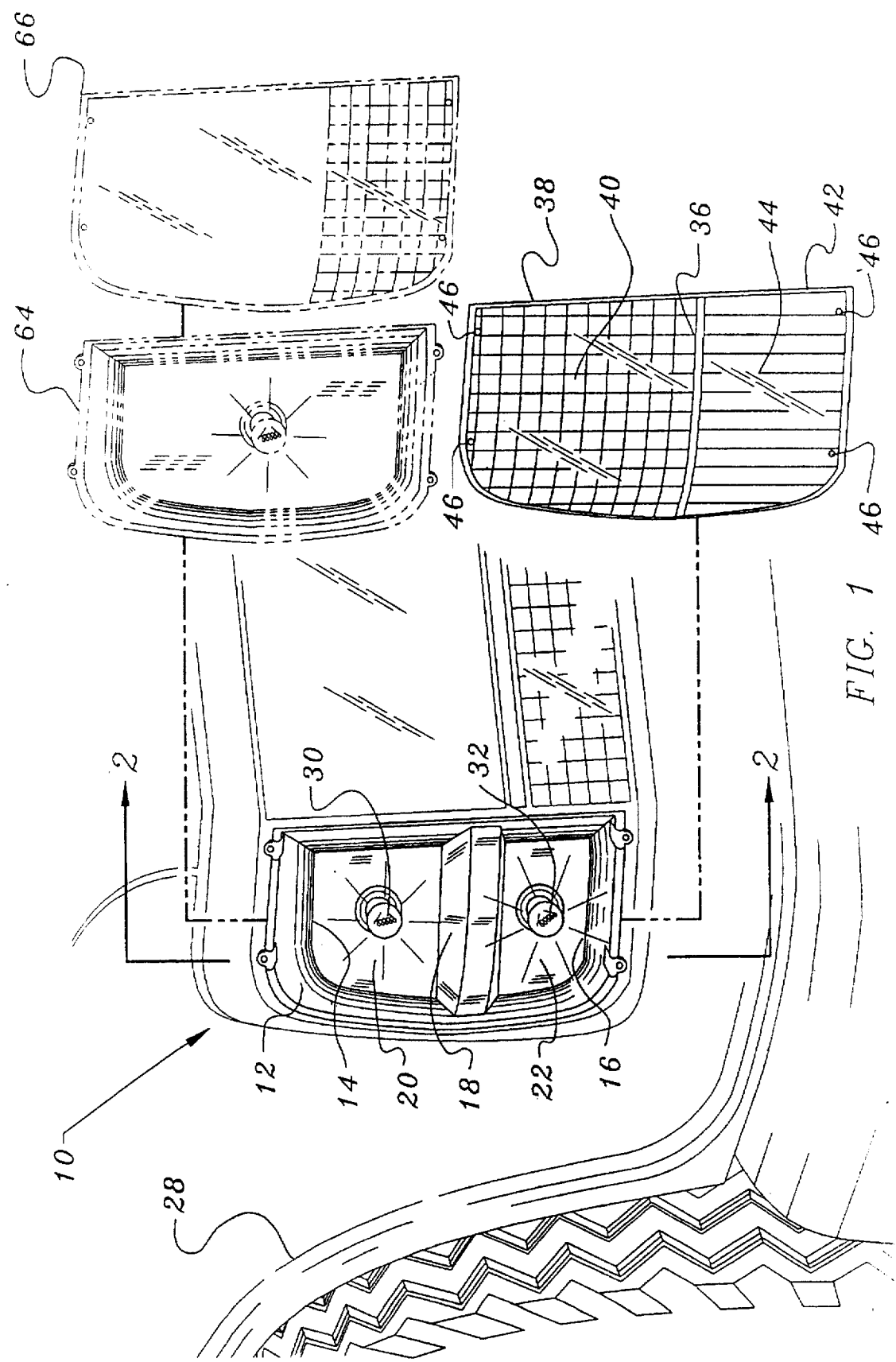
FIG. 1 is a front plan illustration of the preferred embodiment of the vehicle side/front brake lights constructed in accordance with the principles of the present invention.
Figure 2:
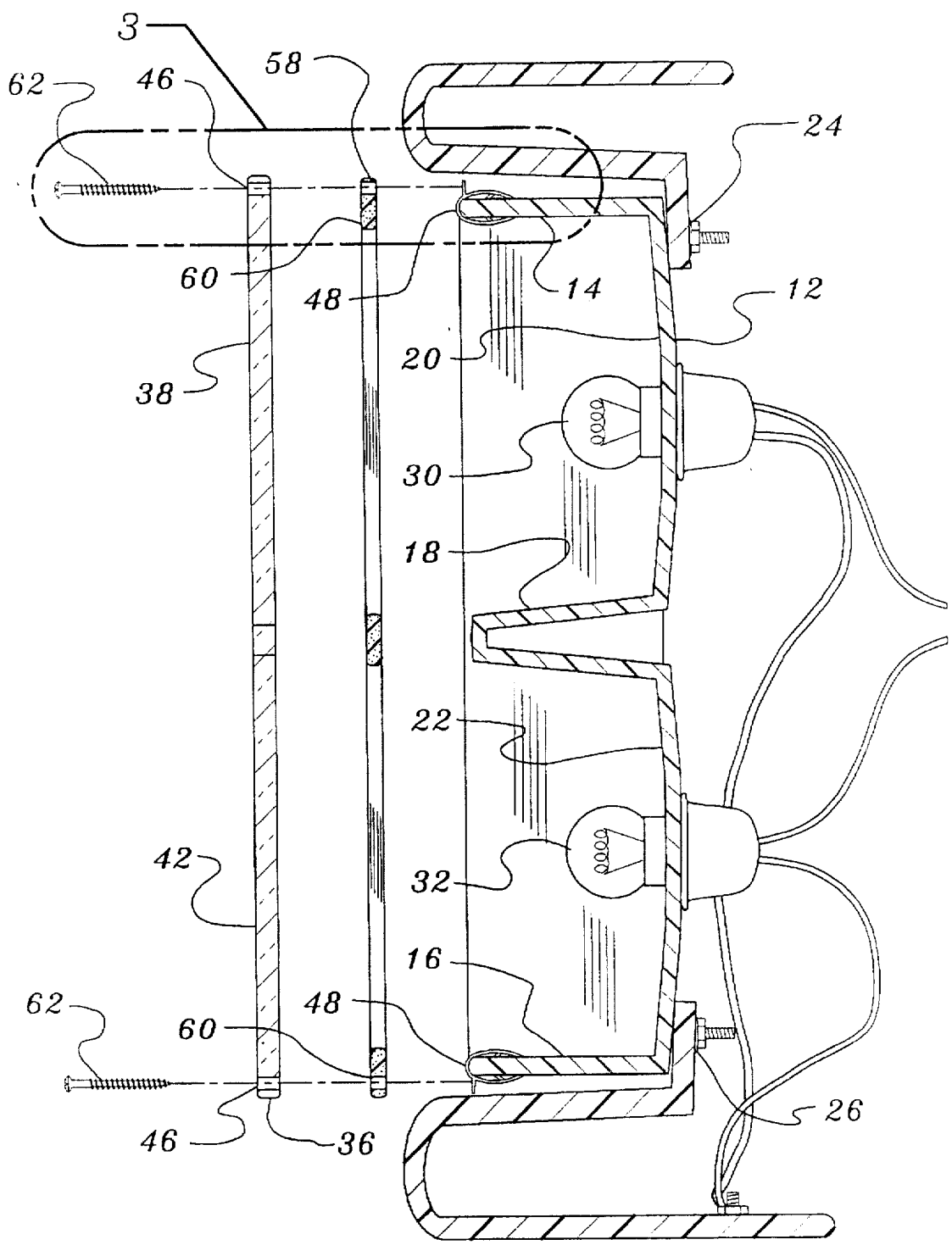
FIG. 2 is a cross-sectional side view of the vehicle side/front brake lights.
Figure 3:
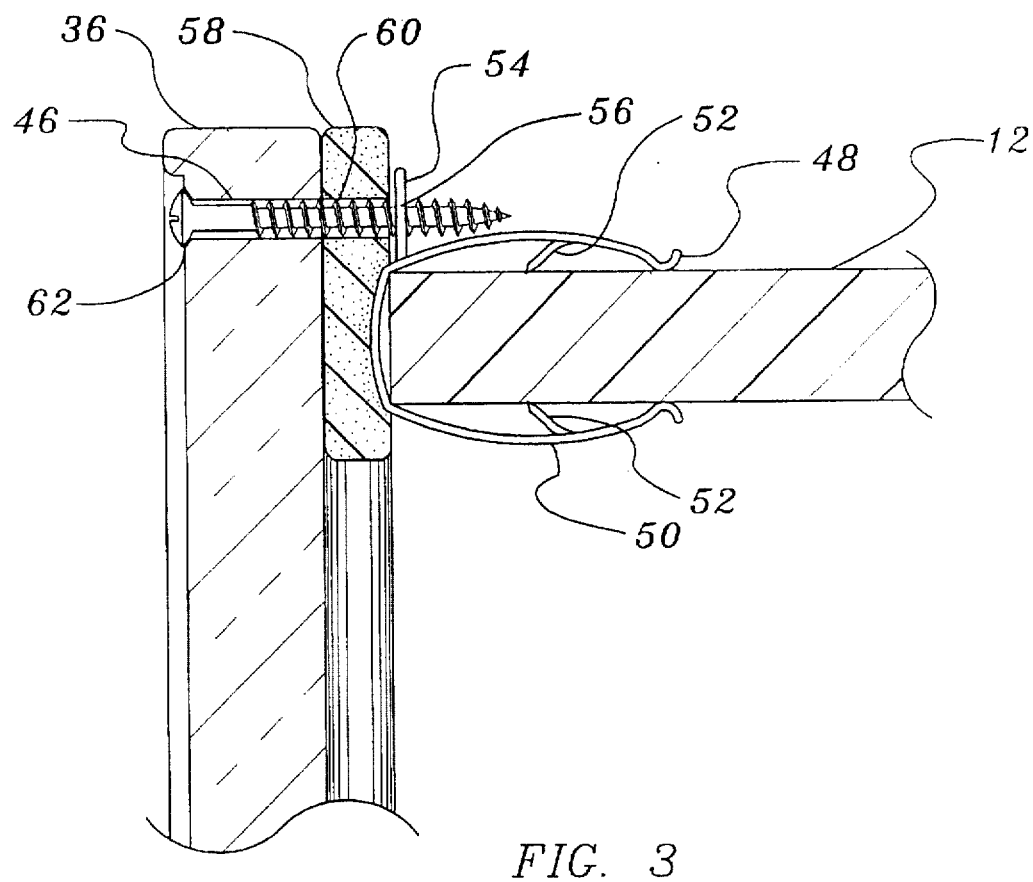
FIG. 3 is a close-up cross-sectional side view of the present invention in an assembled orientation.

With reference now to the drawings, and in particular to FIG. 1 thereof, the preferred embodiment of the new and improved vehicle side/front brake lights embodying the principles and concepts of the present invention and generally designated by the reference numeral 10 will be described.

The present invention, the new and improved vehicle side/front brake lights is a system 10 comprised of a plurality of components. In their broadest context, the components include a light frame, turn signal bulb, brake indicator bulb, and two-tone translucent cover. Each of the individual components is specifically configured and correlated one with respect to the other so as to attain the desired objectives.

More specifically, the system 10 of the present invention includes a light frame 12 with a rectangular configuration. The light frame comprising an upper wall 14, lower wall 16, pair of side walls, and rear wall. The rear wall has a V-shaped divider 18 formed at a central extent thereof which defines an upper rectangular recess 20 and lower rectangular recess 22. The inner surface of the light frame comprises a metallic reflective surface. The light frame has a first pair of bores 24 formed in a top extent of the upper recess and a second pair of bores 26 formed in a bottom extent of the lower recess. Such bores are adapted to receive a plurality of screws thereby securing the light frame to a conventional vehicle body 28 thus allowing the present invention to be easily retrofitted to an existing vehicle.

A turn signal bulb 30 is located in the upper recess of the light frame. The turn signal bulb is controlled by a conventional turn signal lever of the vehicle.

A brake indicator bulb 32 is located in the lower recess of the light frame. The brake indicator bulb is controlled by a conventional brake pedal 34 of the vehicle.

A two-tone translucent cover 36 has a rectangular top portion 38 with an amber hue and a first type of light diffusing structure 40 and further a rectangular lower portion 42 with a red hue and a second type of diffusing structure 44. The cover also has two pair of apertures 46 positioned at opposed ends thereof.

Also included are two pair of coupling devices 48 each comprising a U-shaped clip 50 rotated ninety degrees. Each coupling device has a pair of friction members 52 coupled to an inner surface thereof which extend inwardly therefrom. A flange 54 is formed on an outboard end of the U-shaped clip and extended upwardly therefrom. The flange further has an aperture 56 formed therein. The U-shaped clips are adapted to secure to a periphery of the upper wall and lower wall whereby an inner surface of the outboard end, the friction members, and inboard end of the U-shaped clip abut each respective wall.

A bushing 58 lines the periphery and divider of the cover. The bushing has two pair of apertures 60 formed therein.

A pair of screws 62 are included for screwably coupling within the apertures of the cover, bushing, and U-shaped clips thereby allowing the securement thereof.

Figure 4:
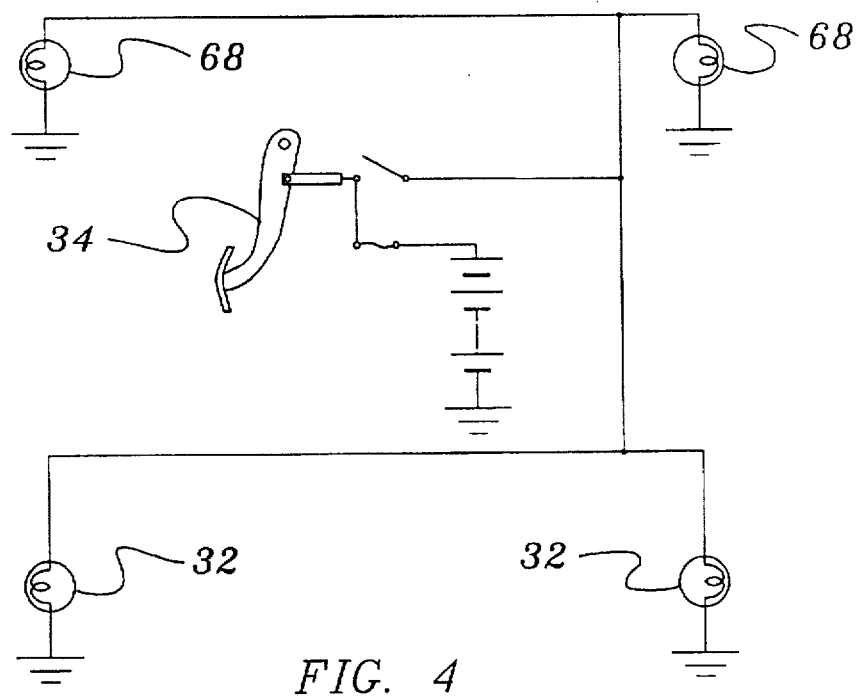
FIG. 4 is a schematic of the circuitry employed in the present invention.

The present invention thus allows the turn signal bulb to disperse an amber light upon actuation of the turn signal of the vehicle and further allows the brake indicator light to disperse a red light from the side of the vehicle upon the actuation of the brake pedal of the vehicle. Such a feature offers an unsurpassed advantage to pedestrians, bicyclists, and other drivers with a perpendicular direction of travel with respect to a first vehicle by indicating whether a driver in traffic is decelerating. The invention thereby offers a significant safety measure that prevents accidents. The side brake light is also specifically tailored to allow easy installation in an existing vehicle and further capable of being integrally manufactured therein. As shown in FIG. 4, the bulbs of the present invention may be easily connected in parallel with existing rear brake light bulbs.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A new and improved vehicle side/front brake light comprising, in combination:

a light frame with a rectangular configuration comprising an upper wall, a lower wall, a pair of side walls, and a rear wall having a V-shaped divider formed at a central extent thereof defining an upper rectangular recess and lower rectangular recess, the light frame having a first pair of bores formed in a top extent of the upper recess and a second pair of bores formed in a bottom extent of the lower recess for receiving a plurality of screws thereby allowing the light frame to be coupled to a side of a conventional vehicle body at a front extent thereof;

a turn signal bulb located in the upper recess of the light frame, the turn signal bulb controlled by a conventional turn signal lever of the vehicle;

a brake indicator bulb located in the lower recess of the light frame, the brake indicator bulb controlled by a conventional brake pedal of the vehicle;

a two-tone translucent cover having a rectangular top portion with an amber hue and a first type of light diffusing structure, a rectangular lower portion with a red hue and a second type of diffusing structure, and further two pair of apertures positioned at opposed ends thereof;

two pair of coupling devices each comprising a U-shaped clip rotated ninety degrees and having a pair of friction members coupled to an inner surface thereof and extended inwardly therefrom and a flange formed on an outboard end thereof and extended upwardly therefrom, the flange further having an aperture formed therein, the U-shaped clips adapted to secure to a periphery of the upper wall and lower wall of the light frame whereby the inner surface of the outboard end, friction members, and right ends of the U-shaped clip abut each respective wall;

a bushing lining the periphery and the divider of the cover, the bushing having two pair of apertures formed therein; and a pair of screws for screwably coupling within the apertures of the cover, bushing, and U-shaped clips thereby allowing the securement thereof and further allowing the turn signal bulb to disperse an amber light upon actuation of the turn signal and further allowing the brake indicator light to disperse a red light from the side/front of the vehicle upon actuation of the brake pedal.

2. A side/front brake light comprising:

a brake indicator bulb located in a recess formed in a side/front of a vehicle at a front extent thereof, the brake indicator bulb actuated upon braking of the vehicle;

a cover with a red hue coupled over the recess allowing the brake indicator light to disperse a red light from the side/front of the vehicle upon braking;

a turn signal bulb located in the recess formed in the side end of the vehicle, the turn signal bulb controlled by a conventional turn signal lever of the vehicle;

a divider coupled between brake indicator bulb and the turn signal bulb for precluding light from dispersing therebetween;

a translucent turn signal bulb cover having an amber hue allowing the turn signal light to disperse an amber light upon actuation of the turn signal; and a bushing coupled between a periphery of the recess and each cover for providing a protective seal about the bulbs.

* * * * *